United States Patent [19]

McGaughey

[11] 4,286,820
[45] Sep. 1, 1981

[54] TRUCK COVER AND DOOR THEREFOR
[75] Inventor: Donald C. McGaughey, Bristol, Ind.
[73] Assignee: State Wide Aluminum of Indiana, Inc., Elkhart, Ind.
[21] Appl. No.: 54,840
[22] Filed: Jul. 5, 1979
[51] Int. Cl.³ .............................................. B60P 3/00
[52] U.S. Cl. .................................................... 296/146
[58] Field of Search ..................... 296/146, 37.16, 148, 296/137 B, 137 C, 201, 156–163, 164–171, 98, 100, 219, 221, 147; 49/386; 16/193; 160/80

[56] References Cited
U.S. PATENT DOCUMENTS

| 4,101,162 | 7/1978 | Koehr | 296/164 X |
| 4,184,709 | 1/1980 | Kim | 296/146 X |
| 4,185,415 | 1/1980 | LaConte | 49/386 X |

FOREIGN PATENT DOCUMENTS 735337  5/1966  Canada ...................................... 296/169

Primary Examiner—Joseph F. Peters, Jr.
Assistant Examiner—Norman L. Stack, Jr.
Attorney, Agent, or Firm—Price, Heneveld, Huizenga & Cooper

[57] ABSTRACT

An improved truck cover having a door with a door prop wherein the bracket member by which the support or prop element is mounted to the door is provided with a flange member attachable to the face and edge portions of the door.

15 Claims, 8 Drawing Figures

TRUCK COVER AND DOOR THEREFOR

BACKGROUND OF THE INVENTION

Truck covers commonly called "caps" for pickup trucks and similar vehicles are commonly equipped with a rear door which cooperates with the tailgate to provide access to the interior of the top cover and the bed of the vehicle.

Such doors have been provided with various mechanisms, herein referred to as props or supports including spring-loaded telescopic cylinders, to support the door in an open position, and when closed, to assist in holding the door in a closed position. The support or prop is conventionally affixed by rivets or similar fastening means to the flat inside face of the metal framework of the door sash. Generally, the wall thickness of the door frame is not sufficient for the fastening means to withstand the forces on them without pulling loose and as a result, the door frame has conventionally been reinforced by a backing plate inserted behind the wall through a specially prepared opening cut into the side of the frame. Such backing plates involve additional costs and manufacturing steps as they require an opening to be cut through the side of the sash and the backing plate inserted between the front and back surfaces of the door sash to receive the rivets.

The telescopic prop, which may be a metal tubular spring-loaded structure, is fixed at its opposite end to the frame formed in the top. It is usually spring loaded to hold the door in an open position and the prop assumes an over-center position to hold the door closed. The amount of force applied by the spring within the prop to hold the door in open position is determined by its particular application and is selected by considering such parameters as door size and weight. The force applied must be sufficient to hold the door open and yet must not be so great such that excessive forces are applied to the door frame and sash when the door is moved to closed position. Usually in each such application, two props are installed, one on each side of the door. In one typical application, the props positioned at opposite sides of the door are equipped with props having a spring force of 18 pounds, this force conventionally referring to the spring force applied between the telescoped members when in compressed condition. Obviously, when expanded, the spring must provide sufficient force to hold the door in open position.

Heretofore, attempts have been made to reduce the gauge of the metal used in the door and to reduce the overall cross-sectional dimensions of the door frame in order to reduce the costs of the doors and provide a less expensive construction for the public. However, such attempts have compounded the problem of securing and fastening the prop to the door so as to withstand the lateral and twisting forces exerted on the securement and fastening means.

Attempts have also been made with respect to preexisting doors and even the lighter gauge doors to provide a door structure using only one prop positioned at one side of the door. In such constructions, the prop is subjected to even greater forces and stresses tending to cause the rivets or other fastening means by which the mounting bracket is fixed to the door sash to pull out of the metal resulting in damage to the door and great inconvenience to the owner. In such instances, even the conventional backing plate positioned inside the door sash did not provide sufficient reinforcement.

SUMMARY OF THE INVENTION

The present invention overcomes the difficulties outlined above in its provision of a specially formed mounting bracket by which the prop is fixed to the door sash. The prop includes a pair of telescopic members having a spring captured therebetween which, in its relaxed position, tends to expand the telescoping members to hold the door in an open position. One end of the prop is pivotally fixed to the door frame while the other end is fixed by a mounting bracket to the door sash. The mounting bracket includes first and second mounting surfaces positioned relative to each other whereby the bracket is mounted to the face and side portions of the door sash. The provision of the two mounting surfaces provides means whereby when affixed, the bracket can accommodate various forces applied to the door as it is moved between its open and closed positions. The mounting means as screws, rivets or the like by which the bracket is affixed to the door are positioned in orthogonal planes, thereby accommodating the various loads placed thereon. In use, the bracket will not pull loose from the door sash but rather is securely fixed thereto. Since additional mounting surfaces are provided, the interconnection is so significantly improved that it is not necessary to provide a separate mounting plate within the interior of the door sash to receive the fastening devices.

It has been found, for example, that since the novel mounting of the invention is so superior, a single prop having an increased spring force can be used to hold the door open. In a typical example, a single prop is utilized having a compressed spring force of 28 pounds. The prop was fixed to the door with the novel bracket of the invention by rivets, without backing plates and in use, no failures occurred.

Since the backing plate can be eliminated, it is possible to provide a thinner door structure resulting in significant cost savings. As mentioned above, the spring force applied by the prop or props on a particular door structure depends on size, weight and the like. The use of one or two props per door is optional, depending upon the end user requirements and the spring size will be selected accordingly.

The present invention provides not only an improved mounting, but also provides significant savings in manufacturing as the extra fabrication steps during assembly including cutting an opening through the edge surface of the door sash to receive a backing plate is eliminated. The prop may be easily installed by simply drilling appropriate mounting openings in the door sash and fixing the bracket with rivets or screws about orthogonal planes.

DETAILED DESCRIPTION OF THE PREFERRED EMBODIMENT

Figure 1:
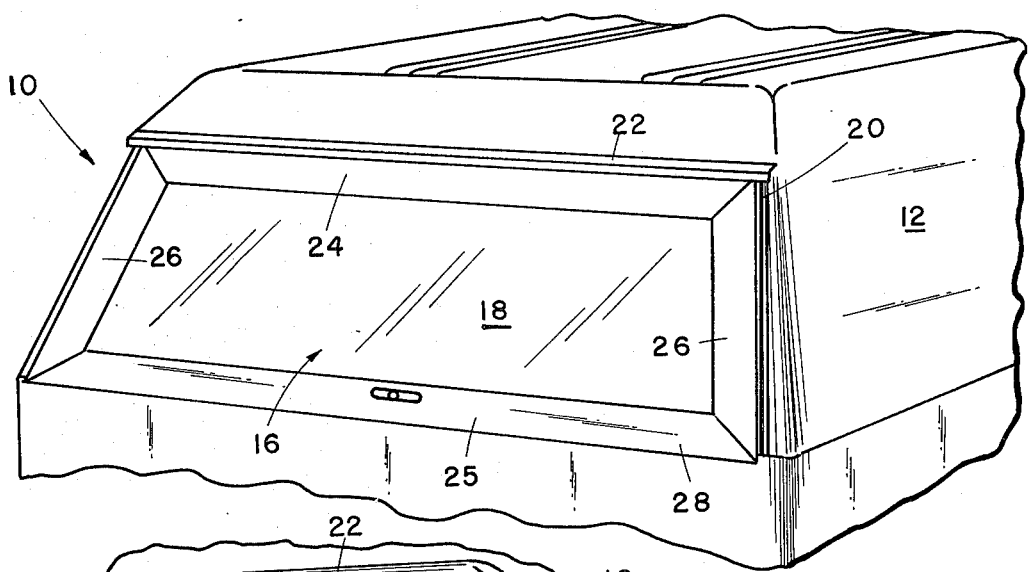
FIG. 1 is a partial perspective view of a truck top cover having a closure member or door on which the invention is incorporated.
Figure 2:
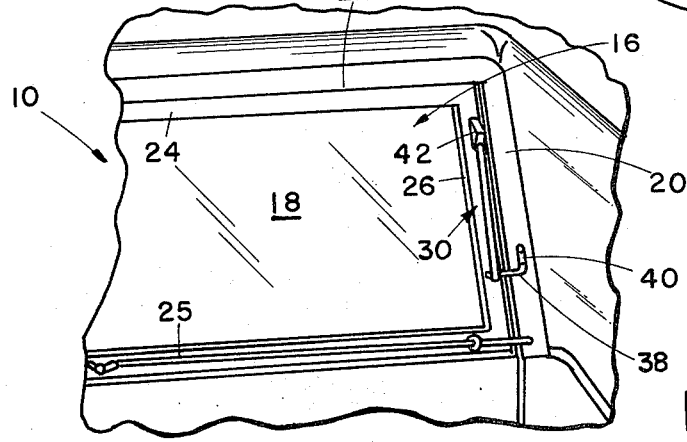
FIG. 2 is a fragmentary perspective view of the inside of the truck cover illustrating the mounting of the prop assembly.
Figure 3:
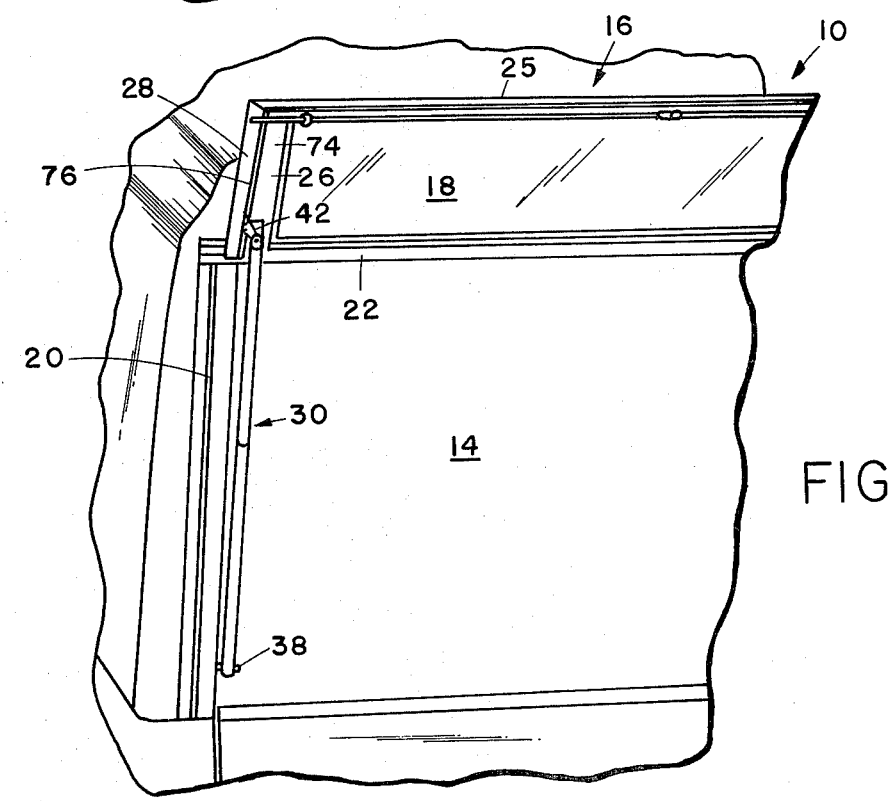
FIG. 3 is a fragmentary view illustrating the door in open position.
Figure 4:
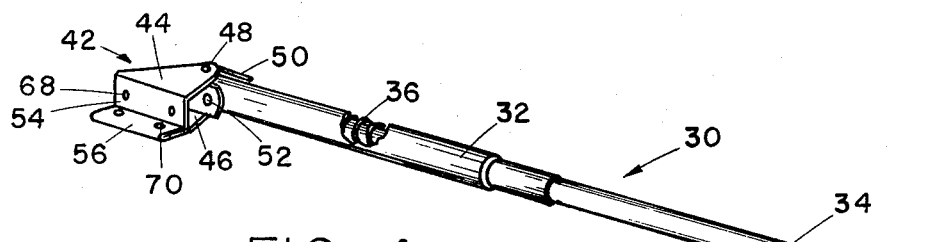
FIG. 4 is a perspective view of the prop assembly in extended position.
Figure 5:
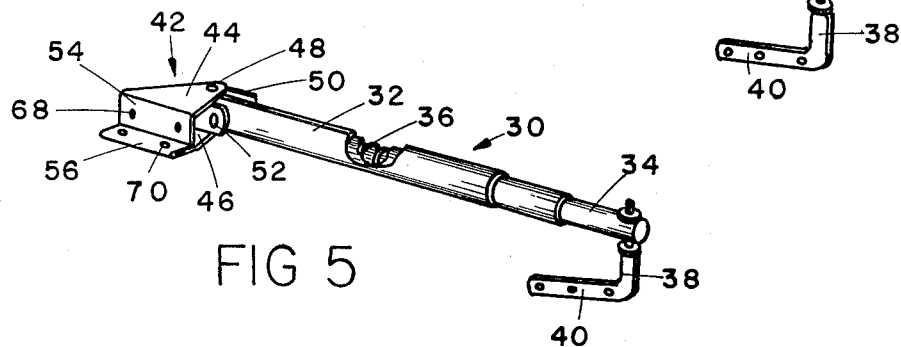
FIG. 5 is a view similar to FIG. 4 illustrating the prop assembly in compressed position.

Referring now to the drawings and in particular to FIGS. 1-3, a vehicle, as a truck, generally designated by the numeral 10 is shown with a top cover or cap 12 mounted thereon in a conventional fashion. The cap includes an access opening 14 which is covered by a door assembly 16. Door assembly 16 is of conventional construction and may include a window 18. The door assembly includes an outer supportive frame 20 in which the door assembly 16 is hingedly mounted along its top surface 22. The window is surrounded by a sash including top and bottom sash members 24 and 25 and side sash members 26. The sash is generally formed of extruded aluminum and may include an outwardly extending flange 28 which may be equipped with suitable sealing means to fit tightly against door frame 20 when the door is closed. A telescopic, spring-loaded prop member 30 to hold the door open is of conventional construction. The prop, shown in greater detail in FIGS. 4 and 5, includes first and second tubular members 32 and 34, respectively, which are adapted to contain a spring 36 which acts to extend the first tubular member with respect to the second. One end of the tubular member is provided with an arm 38 which includes a mounting surface 40 by which one end of prop 30 is secured to the inside of the door frame 20 (FIG. 2).

The opposite end of prop assembly 30 is equipped with a mounting bracket 42 by which the prop assembly is connected to side sash 26 of door assembly 16.

Figure 6:
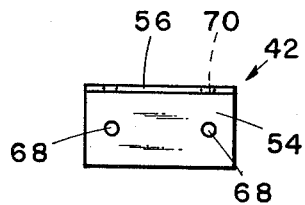
FIG. 6 is a plan view of the prop mounting bracket.
Figure 7:
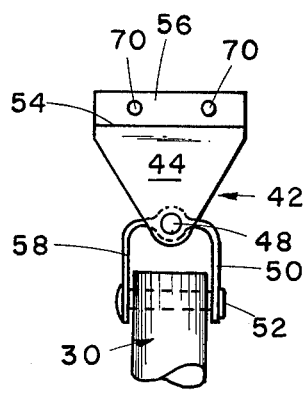
FIG. 7 is a side view of the mounting bracket illustrating a yoke and prop attached thereto.
Figure 8:
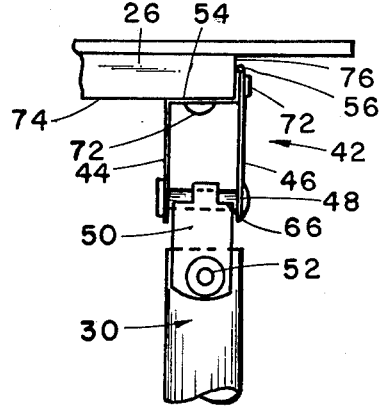
FIG. 8 is an end view of the prop mounting bracket shown in FIGS. 6 and 7.

Mounting bracket 42 is shown in greater detail in FIGS. 6-8. Bracket 42 is generally U-shaped and includes a pair of generally parallel sidewalls 44 and 46 (FIG. 8). The sidewalls are adapted, at their open end, to receive a pin 48 by which the bracket is mounted to a yoke 50 and a second pin 52 to the end of prop 30. The yoke may be omitted and the bracket pivotally mounted directly to prop 30 by pin 52, depending on the particular application. Sidewalls 44 and 46 extend upwardly to the bottom of the U-shape where they form a mounting surface 54. Sidewall 46 extends upwardly a short distance perpendicular to mounting surface 54 to form a second mounting surface or flange 56. The material from which flange 56 is formed is rolled over upon itself and extends parallel to sidewall 46 to form a double thickness at flange 56. The mounting bracket can be formed of a single piece of sheet metal by utilizing conventional progressive die forming techniques. Although a stamped metal product as illustrated is preferred, it will be appreciated that the bracket may be formed utilizing any number of manufacturing techniques to provide the L-shaped mounting surfaces 54 and 56 at which the bracket is secured to the door sash as will be hereinafter described.

Figure 9:
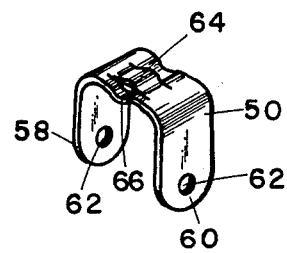
FIG. 9 is a perspective view of the yoke.

Referring briefly to FIG. 9, yoke assembly 50 may be formed from sheet material to form a pair of legs 58 and 60 having suitable openings 62 to receive pin 52 by which the yoke is secured to prop 30. The juncture between legs 58 and 60 is formed to include a raised center portion 64 and a depressed portion 66 to receive pin 48 which passes through openings provided in mounting bracket 38.

As illustrated in FIG. 8, mounting bracket 38 is secured to side sash 26 of door assembly 16 by means of conventional rivets or other suitable fastening means. In a preferred embodiment of the invention, holes 68 and 70 are provided in mounting surfaces 54 and 56, respectively, to receive fasteners 72. Mounting holes may be drilled through openings 68 and 70 and into the face surface 74 and edge surface 76 of sash 26 (FIG. 8). Preferably, an expandable rivet of the type known as a "Pop Rivet" may be used to fix mounting bracket 38 to sash 26, although sheet metal screws may be used if desired.

When assembled as shown in FIG. 8, the bracket is secured to the door assembly along orthogonal planes on the door face surface 74 and edge surface 76 at bracket mounting surfaces 54 and 56, respectively.

In view of the above, it will be seen that the novel mounting bracket fixing the prop to the door, at orthogonal planes, evenly distributes the lateral, longitudinal and transversal forces and thus provides greater strength at the interface of the door sash and bracket. Accordingly, the inherent problems of the conventional mounting are eliminated.

Although the invention has been described with reference to a particular embodiment, those skilled in the art will appreciate that other variations and modifications can be employed without departing from the scope of the invention as defined by the following claims.

The embodiments of the invention in which an exclusive property or privilege is claimed are defined as follows.

1. In a truck top cover for use on a vehicle having a rear access opening formed by a frame and a door, said door having opposed faces and edges, said edges extending peripherally between said faces, said door being hingedly mounted to said frame along one edge and swingable between open and closed positions relative to the frame, a telescopic prop member to hold said door in said open position whether the vehicle is moving or at rest, and means mounting the prop to said door;

said mounting means including a bracket member pivotally mounted to said prop and including means defining first and second mounting surfaces positioned substantially at right angles with respect to each other, said first surface being adapted for rigid attachment to one of said faces of said door and said second surface being adapted for rigid attachment to one of said other edges of said door whereby said door is held in a relatively rigid manner in said open position and resists jarring and vibratory forces acting in a direction substantially parallel with the axis of the hinge of said door such that said door is held sufficiently rigid even though the vehicle is in motion.

2. The improvement of claim 1 wherein a single prop member is sufficient to hold said door in said open position even though said vehicle is in motion in normal use situations.

3. A frame and door construction for a truck top cover having a rear access opening receiving said construction comprising:

a frame and a door member, said door member having opposed face and edge surfaces and being swingably mounted about an axis along one edge between open and closed positions relative to the frame;

a telescopic prop member to hold said door in said open position, and means mounting said prop to said door, the improvement in said mounting means comprising:

a bracket member pivotally fixed at one portion to said prop and having a second portion forming at least a pair of mounting surfaces substantially perpendicular to each other, one of said surfaces being adapted for rigid attachment to one of said face surfaces and the other to one of said other edge surfaces whereby said door is held in a relatively rigid manner in said open position and resists jarring and vibratory forces acting in a direction substantially parallel with the axis of the hinge of said door such that said door is held sufficiently rigid even though the vehicle is in motion.

4. The improvement of claim 3 wherein a single prop member is sufficient to hold said door in said open position even though said vehicle is in motion in normal use situations.

5. The improvement of claim 3 wherein said bracket member is formed from a single piece of sheet material and includes a pair of generally parallel sidewalls, said one of said pair of mounting surfaces being formed between said sidewalls, one of said sidewalls extending therebeyond to form said other of said pair of mounting surfaces.

6. The improvement of claim 5 wherein said extending sidewall forming said other mounting surface is rolled back upon itself to form a double thickness at said other mounting surface.

7. A telescoping prop for a truck top cover door comprising first and second telescoping members having biasing means for biasing them apart and mounting means for securing one end of one of said telescopic prop members to said door and the other end to the top cover comprising said mounting means including a bracket member adapted for mounting at one end to said prop and the other end to said door, said bracket forming a first mounting surface having an array of fastener receiving means formed therein and a flange extending generally orthogonally to said first mounting surface forming a second mounting surface, said second mounting surface also having an array of fastener receiving means formed therein; said mounting surfaces being arranged to be respectively secured to the front face and side edge of said door.

8. The bracket member of claim 7 wherein said flange forming said second mounting surface is rolled back upon itself to form a double thickness at said second mounting surface.

9. In a truck top cover having a rear access opening formed by a frame and a door, said door having opposed face surfaces facing said opening and edge surfaces extending from the marginal edges of said face surfaces in a direction away from said opening when the door is in the closed position, said door swingable about an axis along one edge between open and closed positions relative to the frame, a telescopic prop member to hold said door in open position, and means mounting the prop to said door;

said mounting means including a bracket member pivotally mounted to said prop and including first and second mounting surfaces positioned substantially at right angles with respect to each other, said first surface being adapted for mounting on one face surface of said door and said second surface being adapted for mounting on one of the other of said edge surfaces of said door whereby, a single prop member is sufficent to hold said door in a relatively rigid manner when said door is positioned in said open position even though said vehicle is in motion under normal use situations.

10. The improvement of claim 9 wherein said first and second surfaces have means formed therein to receive fastening means whereby said bracket is secured to said face and edge surfaces of said cover.

11. The improvement of claim 10 wherein said bracket is formed from a single piece of sheet material and includes a pair of generally parallel sidewalls, said first mounting surface being formed between said sidewalls, one of said sidewalls extending beyond said first mounting surface to form said second mounting surface.

12. The improvement of claim 11 wherein said one of said sidewalls forming said second mounting surface is rolled back upon itself to form a double thickness at said second mounting surface.

13. The improvement of claim 1 or 9 wherein said bracket member is generally U-shaped, the open end thereof being adapted for pivotal mounting to said one end of said prop, the other end of said U-shaped member forming said first surface, and a flange extending generally orthogonally to said first surface to form said second surface.

14. The improvement of claims 1, 3, 7 or 9 where said bracket member is pivotally mounted to said prop by a universal joint.

15. The improvement of claims 1, 3, 7 or 9 where said bracket member is pivotally mounted to said prop by a universal joint;

said universal joint including a yoke;

a first shaft extending through said bracket, said yoke being pivoted about said first shaft;

a second shaft extending through said yoke orthogonal to said first shaft, and said prop being pivotable about said second shaft.

* * * * *